(12) United States Patent
Sato et al.

(10) Patent No.: US 6,622,146 B1
(45) Date of Patent: Sep. 16, 2003

(54) SYSTEM MANAGING METHOD AND APPARATUS FOR DECREASING A LOAD APPLIED TO A COMMON PROCESSING UNIT

(75) Inventors: Masayuki Sato, Kawasaki (JP); Akinori Kamijo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/343,653

(22) Filed: Jun. 29, 1999

(30) Foreign Application Priority Data

Aug. 31, 1998 (JP) .......................... 10-244725

(51) Int. Cl.⁷ .......................... G06F 17/30; G06F 15/16
(52) U.S. Cl. .......................... 707/102; 707/10; 707/100; 707/101; 707/103 R; 709/223
(58) Field of Search .......................... 707/103, 10, 100, 707/102, 101, 103 R; 709/223

(56) References Cited

U.S. PATENT DOCUMENTS

| | | | | |
|---|---|---|---|---|
| 4,930,071 A | * | 5/1990 | Tou et al. .................... 364/300 |
| 5,287,447 A | * | 2/1994 | Miller et al. ................. 395/157 |
| 5,317,742 A | * | 5/1994 | Bapat .......................... 395/700 |
| 5,608,857 A | * | 3/1997 | Ikeo et al. ................... 395/761 |
| 5,615,112 A | * | 3/1997 | Liu Sheng et al. ......... 707/104.1 |
| 5,764,955 A | * | 6/1998 | Doolan ........................ 395/500 |
| 5,822,569 A | * | 10/1998 | McPartlan et al. .......... 395/500 |
| 5,836,008 A | * | 11/1998 | Goumillou ................... 370/419 |
| 5,850,428 A | * | 12/1998 | Day ............................ 379/88 |
| 5,937,084 A | * | 8/1999 | Crabtree et al. ............. 382/137 |
| 5,943,650 A | * | 8/1999 | Kanno .......................... 705/1 |
| 5,960,176 A | * | 9/1999 | Kuroki et al. ......... 395/200.53 |
| 5,966,707 A | * | 10/1999 | Van Huben et al. .......... 707/10 |
| 5,966,713 A | * | 10/1999 | Carlsund et al. ............ 707/200 |
| 5,995,959 A | * | 11/1999 | Friedman et al. ............... 707/3 |
| 6,012,152 A | * | 1/2000 | Douik et al. .................. 714/26 |
| 6,104,835 A | * | 8/2000 | Han ............................ 382/225 |
| 6,104,868 A | * | 8/2000 | Peters et al. ........... 395/200.32 |
| 6,138,154 A | * | 10/2000 | Karino ........................ 709/223 |
| 6,226,679 B1 | * | 5/2001 | Gupta ......................... 709/230 |
| 6,279,087 B1 | * | 8/2001 | Melo et al. .................. 711/146 |
| 6,374,293 B1 | * | 4/2002 | Dev et al. .................... 709/220 |
| 6,408,302 B1 | * | 6/2002 | Lee et al. .................... 707/102 |

FOREIGN PATENT DOCUMENTS

| | | |
|---|---|---|
| JP | 7-191923 | 7/1995 |
| JP | 9-311771 | 12/1997 |

* cited by examiner

Primary Examiner—Frantz Coby
(74) Attorney, Agent, or Firm—Katten Muchin Zavis Rosenman

(57) ABSTRACT

In a system managing method and apparatus, a load applied to a common processing unit is decreased so as to improve a managing ability of the system. The system managing apparatus manages a system having a plurality of interfaces including a managed object interface and a non-managed object interface, the managed object interface handling resources as managed objects, the non-managed object interface handling resources as non-managed objects. A common processing unit performs operations common to the plurality of interfaces. A managed object interface agent is connected to the managed object interface so as to manage pointer attributes independently of the common processing unit. A non-managed object interface agent is connected to the non-managed object interface. The managed object interface agent includes a knowledge database and an agent database. The knowledge database stores information regarding a pointing instance and a pointed instance defined in each pointer attribute. The agent database holds the resources as instances of the managed object type so as to delete, add or update a value of each pointer attribute according to a process request.

4 Claims, 5 Drawing Sheets

SYSTEM MANAGING METHOD AND APPARATUS FOR DECREASING A LOAD APPLIED TO A COMMON PROCESSING UNIT

BACKGROUND OF THE INVENTION

1. Field of the Invention

The present invention generally relates to a system managing method and apparatus and, more particularly, to a system managing method and apparatus using both a managed object interface and a non-managed object interface.

In a system such as an exchange system supporting a plurality of kinds of interfaces including a managed object (MO) interface and a non-managed object (non-MO) interface, it is desired to simplify a process using the MO interface and the non-MO interface. The MO interface includes common management information protocol (CMIP). A TL1 command and a graphical user interface (GUI) are included in the non-MO interface.

2. Description of the Related Art

FIG. 1 is an illustration for explaining a conventional system management model. The system management model shown in FIG. 1 is an open system interconnection (OSI) system which enables interconnection between different computer network systems. In the system management model shown in FIG. 1, communication between a managing system 41 (manager 43) and a managed system 42 is specified. The managed system 42 includes a plurality of managed objects (MOs) 45 and an agent 44 which operates the managed objects 45.

The managing system 41 (manager 43) may correspond to a managing apparatus such as a maintenance terminal apparatus provided with processors and memories. The managed system 42 may correspond to a switching apparatus provided with processors and memories. In the system management model shown in FIG. 1, resources to be managed are abstracted so as to manage the resources as the managed objects. The managed objects include concepts of a managed object class (MO class) and a managed object instance (MO instance). The MO class defines a characteristic of a managed object. The MO class defines attributes, attribute groups, notifications, operations and behavior. The MO instance represents a specific object defined by the MO class.

For example, the above-mentioned CMIP is defined as a protocol for transmission and reception of management commands and notification information of the managed objects 45 between the managing system 41 (manager 43) and the agent 44 of the managed system 42. The CMIP is a protocol for use on an individual managed object basis. A simple network management protocol (SNMP) is well-known as the CMIP. An interface between the manager 43 and the agent 44 is referred to as the MO interface. That is, the MO interface specifies communication between the managing system 41 and the managed objects 45 via the agent 44 such as transmission of managing operation commands from the managing system 41 (manager 43) to the managed objects 45 or transmission of notification from the managed objects 45 to the managing system 41.

Such a specification of communication is known as a common management information service (CMIS). The managing operations according to the CMIS includes, for example, M-GET which is acquisition of an attribute value, M-SET which is setting of an attribute value, M-ACTION which is an operation on the managed object, M-CREATE which is creation of the managed object, M-DELETE which is deletion of a managed object and M-CANCEL-GET which is cancellation of the M-GET. Notification according to the CMIS includes M-ENENT-REPORT which is a notification sent from a managed object.

On the other hand, the TL1 command or the GUI does not handle resources as the managed object. Such an interface is referred to as the non-MO interface. The non-MO interface is used in various systems including a switching system. In the TL1 command, invoked process and parameters for the process are specified.

FIG. 2 is an illustration for explaining another conventional system management model in which both the MO interface and the non-MO interface are used. The management system model shown in FIG. 2 includes a managing system (manager) 51 for the MO interface, a managed system 52, an agent 54, a common processing unit 55 and a managing system (manager) 56 for the non-MO interface.

The managed system 52 is provided with the common processing unit 55 so that a managing operation for both the MO interface managing system 51 and the non-MO interface managing system 52 can be performed. The common processing unit 55 has a structure based on either the MO interface or the non-MO interface.

If the common processing unit 55 has a structure suitable for the MO interface in the above-mentioned system in which both the MO interface and the non-MO interface are supported, the unit of process requested of the common processing unit 55 is the MO class and a full distinguished name (FDN). The FDN is a symbol used for designating the MO instance which belongs to one of the MO classes in the MO interface. That is, the FDN is an identification number of the MO instance managed as a hierarchical structure according to a hierarchical relationship between a plurality of MO classes.

In this case, a function of the common processing unit 55, which function is in accordance with the CMIP command including the MO class name and the FDN, can be correlated to a command sent from the MO interface. However, an appropriate function of the common processing unit 55 cannot be provided in response to a command sent from the non-MO interface since the command does not include the MO class name and the FDN. In such a case, a process is required for relating the non-MO command to a function of the common processing unit 55 that is based on the MO interface. Thus, the agent 54 performs such a process.

On the other hand, if the common processing unit 55 has a structure suitable for the non-MO interface, the function of the common processing unit 55 is constituted by the unit of command handled by the non-MO interface. Thereby, an appropriate function of the common processing unit 55 can be provided in response to a request from the non-MO interface. However, a command in the MO unit from the MO interface must be processed so as to be related to a command unit in the non-MO interface. In such a case, since the command unit of the non-MO interface has a course tendency as compared to that of the MO interface, there is a problem in that an appropriate function of the common processing unit 55 cannot be provided in response to the request from the MO interface.

Additionally, if a pointer attribute defined by the MO interface is handled in the common processing unit 55, it is considered to set a definition of various pointers that indicates a relationship between the instances so as to perform processes according to the definition. However, in order to respond to the request, a large process load is applied to the common processing unit 55. Additionally, there is a problem in that a long time and labor are required to develop a program performing such an operation.

SUMMARY OF THE INVENTION

It is a general object of the present invention to provide an improved and useful system managing method and apparatus in which the above-mentioned problems are eliminated.

A more specific object of the present invention is to provide a system managing method and apparatus in which a load applied to a common processing unit is decreased so as to improve a managing ability of the system.

In order to achieve the above-mentioned objects, there is provided according to the present invention a system managing method and apparatus for managing a system having a plurality of interfaces including a managed object interface and a non-managed object interface, the managed object interface handling resources as managed objects, the non-managed object interface handling resources as non-managed objects. A common processing unit performs operations common to the plurality of interfaces. A managed object interface agent is connected to the managed object interface so as to manage pointer attributes independently from the common processing unit. A non-managed object interface agent is connected to the non-managed object interface. The managed object interface agent includes a knowledge database and an agent database, the knowledge database storing information regarding a pointing instance and a pointed instance defined by each pointer attribute, the agent database holding the resources as instances of the managed object type so as to delete, add or update a value of each pointer attribute according to a process request.

According to the present invention, the pointer attributes can be processed solely by the managed object interface agent. That is, when a process request is transferred from the non-managed object interface agent to the common processing unit, the common processing unit determines whether or not the request is for the resources managed by the managed object interface. If the request is for the resources managed by the managed object interface, the common processing unit transfers the process request to the managed object interface agent so that the request is processed by the managed object interface agent. Thus, the common processing unit is not required to process the request for the resources managed by the managed object interface agent. That is, the common processing unit is required to perform only processes related to the non-managed object and basic processes common to the managed object and the non-managed object. This reduces a load to the common processing unit when a plurality of interfaces including the managed object interface and the non-managed object interface are present.

Other objects, features and advantages of the present invention will become more apparent from the following detailed description when read in conjunction with the accompanying drawings.

DETAILED DESCRIPTION OF THE PREFERRED EMBODIMENT

Figure 1:
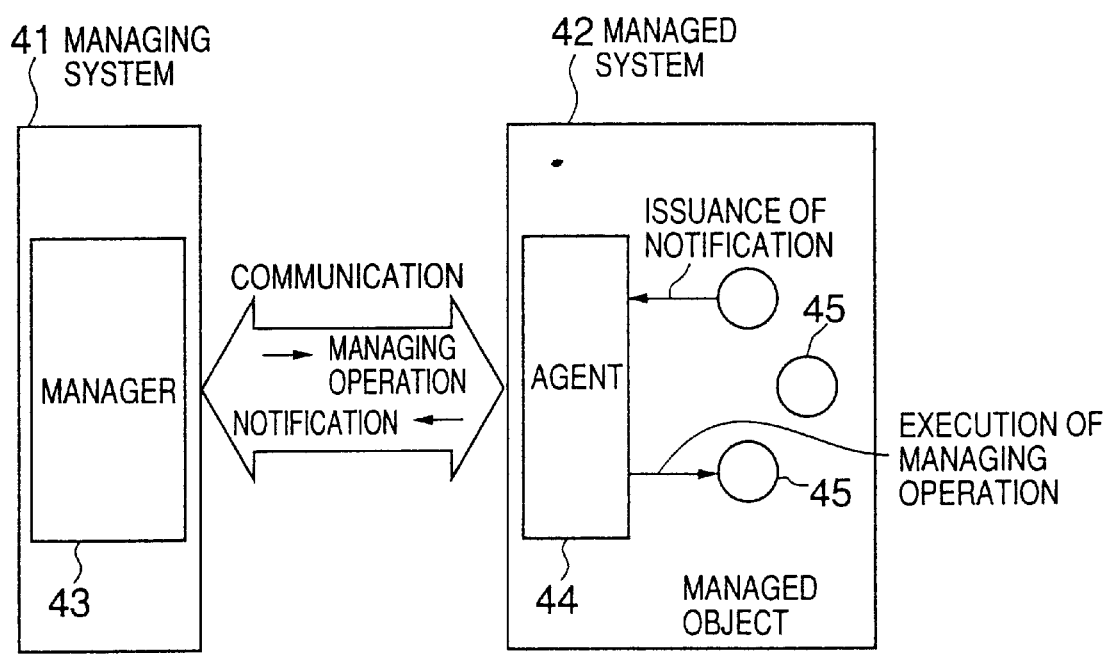
FIG. 1 is an illustration for explaining a conventional system management model.
Figure 2:
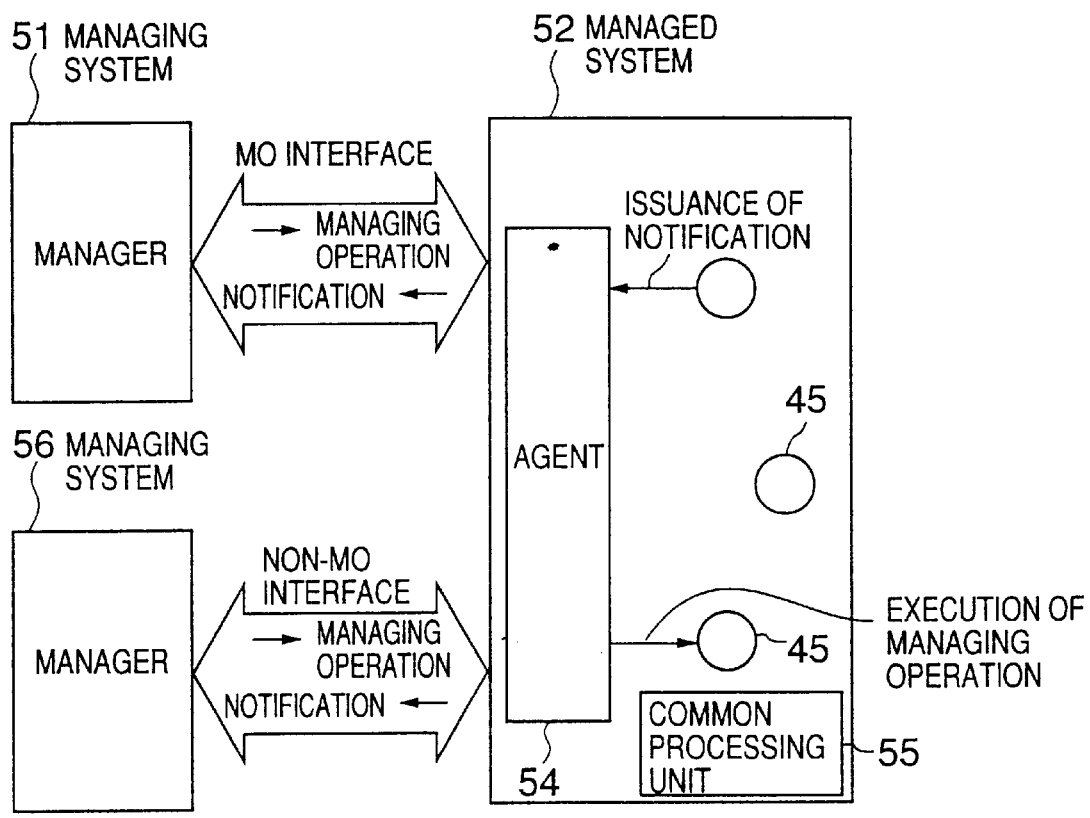
FIG. 2 is an illustration for explaining another conventional system management model in which both an MO interface and a non-MO interface are used.
Figure 3:
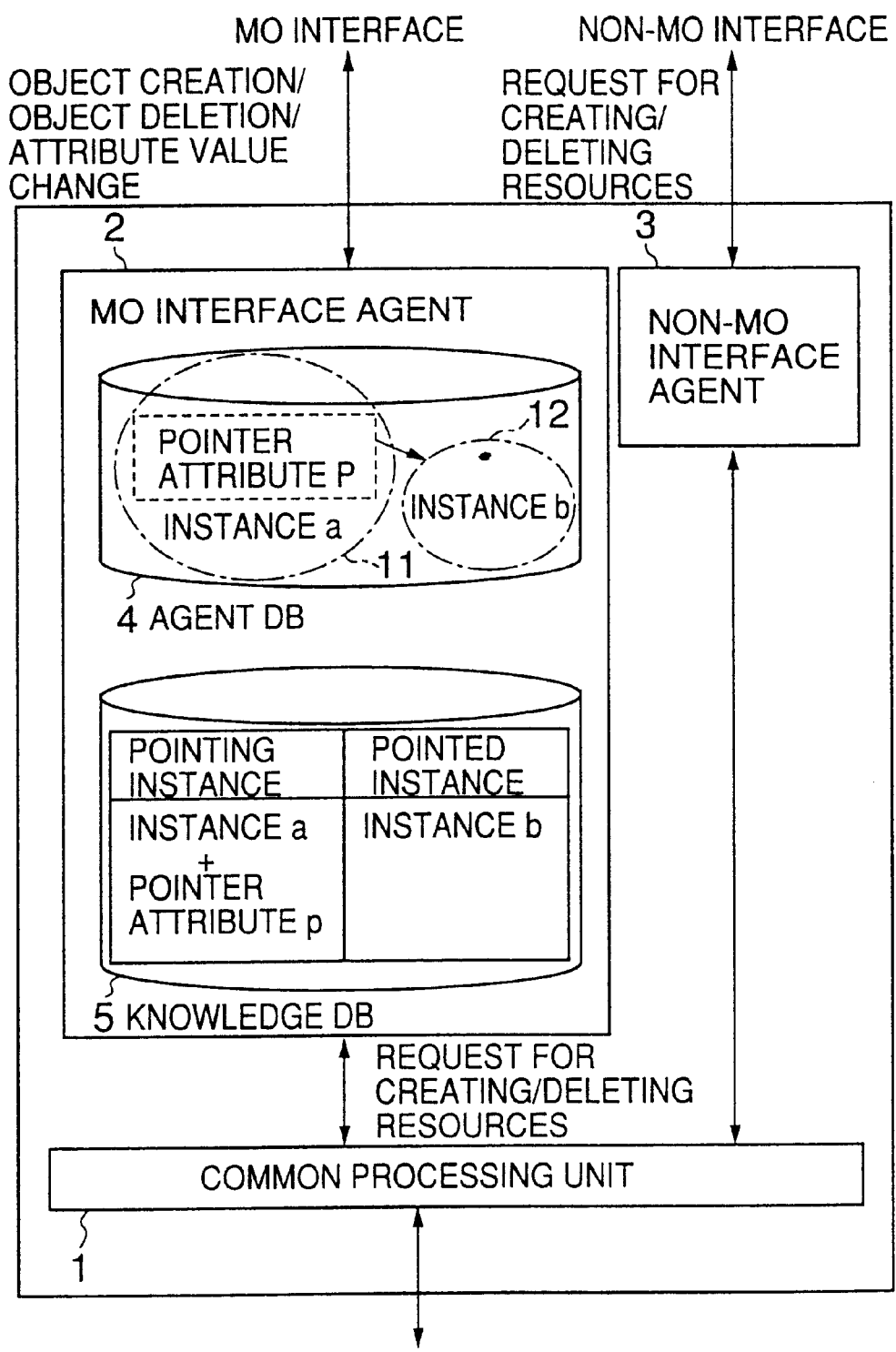
FIG. 3 is a block diagram of a part of a switching apparatus according to a first embodiment of the present invention.

A description will now be given of a system managing apparatus according to a first embodiment of the present invention. FIG. 3 is a block diagram of a part of a switching apparatus according to the first embodiment of the present invention.

The switching apparatus shown in FIG. 3 comprises a common processing unit 1, an MO interface agent 2 and a non-MO interface agent 3. The MO interface agent 2 comprises an agent database (agent DB) 4 and a knowledge database (knowledge DB) 5. The agent database 4 includes instances a and b. A pointer attribute p is data defined in the instance a. It should be noted that an MO interface manager and a non-MO interface manager are not shown in the figure.

The common processing unit 1 performs basic operations of the switching apparatus such as call operations for controlling communication path switches (not shown in the figure). The common processing unit 1 also performs processes common to the MO interface and the non-MO interface. The MO interface agent 2 receives a process request from the MO interface, and sends the process request to the common processing unit 1 when a process requested by the process request is a basic process of the switching apparatus or a process common to the non-MO interface. The non-MO interface agent 3 receives a process request from the non-MO interface, and sends the process request to the common processing unit 1 when a process requested by the process request is a basic process of the switching apparatus or a process common to the MO interface.

The agent database 4 of the MO interface agent 2 stores resources of the switching apparatus as instances of a managed object type. In FIG. 3, the instances a and b correspond to resources of the switching apparatus having object classes A and B, respectively. The pointer attribute p holds information regarding a relationship between the instances a and b. In FIG. 3, the instance a designates the instance b. The knowledge database 5 holds the definition of a pointing instance and a pointed instance of the pointer attribute. The knowledge database 5 also holds information regarding correspondence between the resources when the resources are added or changed. Additionally, information regarding new correspondence can be added to the knowledge database 5.

All pointer attributes used by the MO interface are managed by the MO interface agent 2. An operation for reference, change or notification of change to the pointer attributes is basically performed within the MO interface agent 2 independently of the common processing unit 1. However, when the substance of the pointer attribute is resources which can be managed by the common processing unit 1, the MO interface agent 2 notifies the common processing unit 1 of the contents of operations by using an input interface format of the common processing unit 1.

For example, when a request for deletion (M-DELETE) is made to the instance b, the MO interface agent 2 checks whether or not the pointer attribute referring to the object class B is present by referring to the pointing instances of the knowledge data base 5 by using the object class name (=B)

of the instance b. In FIG. 3, it is assumed that the pointer attribute p of the object class A in the pointing instance designates the object class B as the pointed instance.

The MO interface agent 2 searches the agent database 4 so as to find an instance pointing to the instance b by using the "object class A" and the "pointer attribute p having a value corresponding to the instance be". In the present case, since the instance a is found by the search, the identification number of the instance b is deleted from a value of the pointer attribute defined in the instance a. Additionally, the result of the change is sent to the MO interface manager as an attribute value change notification.

When a request for creating an instance (M-CREATE) is made by the MO interface, the request can be handled in the same manner as the above-mentioned case. In such a case, the MO interface agent 2 refers to the knowledge database 5 so as to add an instance to the agent database 4, and sends the result of the addition to the MO interface manager.

Additionally, when a request for creating or deleting resources managed by the MO interface is issued by the non-MO interface, the non-MO interface agent 3 sends a process request to the common processing unit 1. The common processing unit 1 performs a process requested by the process request. However, when the resources to be processed are managed by the MO interface, the common processing unit 1 notifies the MO interface agent 2 of the creation or deletion of the resources as creation or deletion of an instance.

The MO interface agent 2 searches the knowledge database 5 so as to determine whether or not a pointer attribute, which designates the instance to be created or deleted as a pointed instance, is present. If such a pointer attribute is present, the MO interface agent 2 extracts the pointing instance from the agent database 4 so as to delete a pointer attribute value of the extracted instance when the request is deletion or add a pointer attribute value when the request is creation. Then, the MO interface agent 2 sends a notification of the attribute change to the MO interface manager as the result of the process. That is, in this case, the MO interface agent 2 sends an attribute value change notification to the MO interface.

Figure 4:
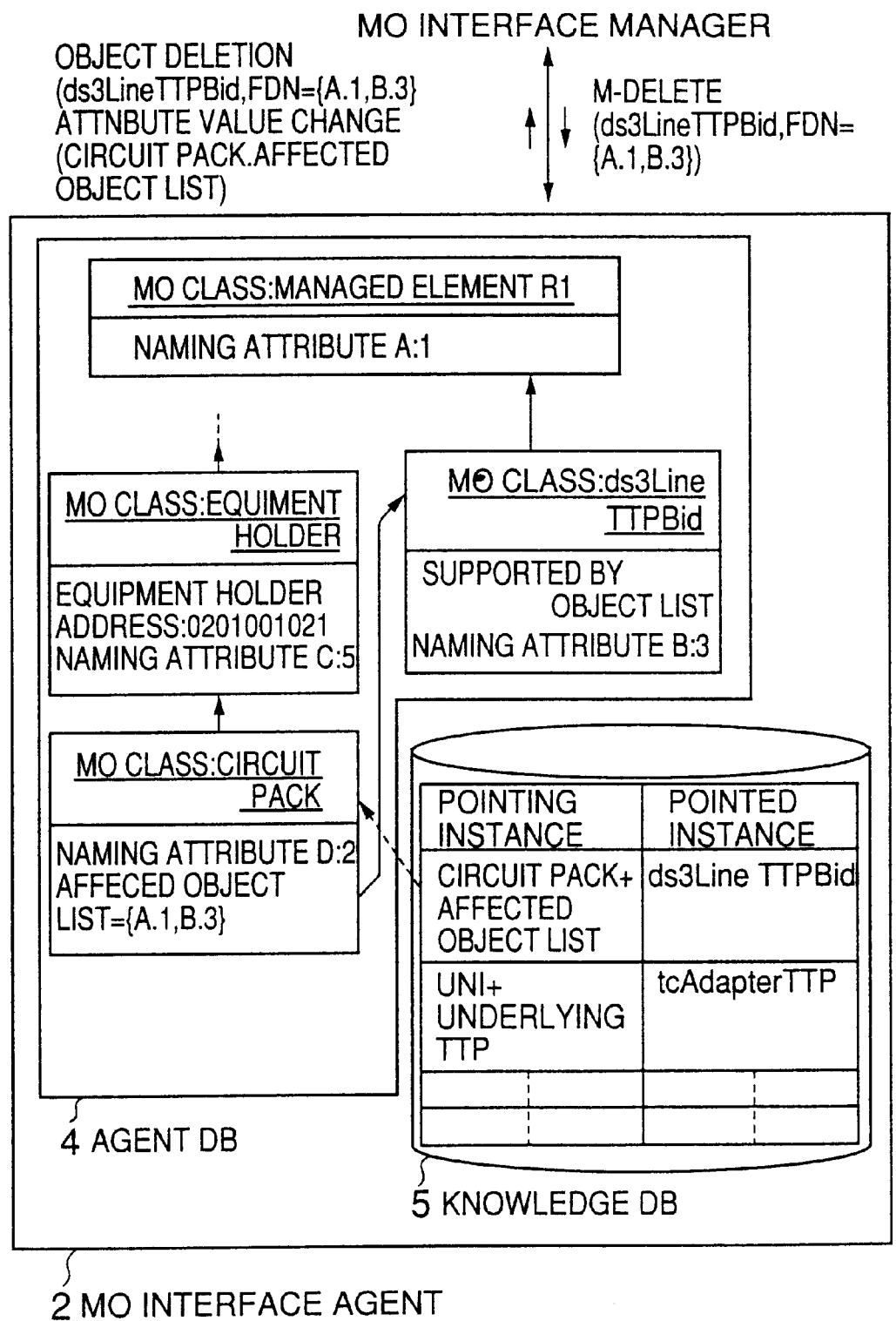
FIG. 4 is an illustration for explaining an operation of an MO interface agent shown in FIG. 3 when a request for deletion is issued by an MO interface manager.

FIG. 4 is an illustration for explaining an operation of the MO interface agent 2 shown in FIG. 3 when a request of deletion is issued by the MO interface manager. In FIG. 4, parts that are the same as the parts shown in FIG. 3 are given the same reference numerals, and descriptions thereof will be omitted.

In FIG. 4, it is assumed that a request of deletion (M-DELETE) is issued by the MO interface manager. The contents of the request of deletion is (ds3LineTTPBid, FDN={A.1, B.3}). The MO interface agent 2 searches the knowledge database 5 with respect to the object class (ds3LineTTPBid) to be deleted and the identification number FDN={A.1, B.3} so as to check whether or not an object pointing to the object class (ds3LineTTBid) to be deleted is present.

As mentioned above, the knowledge database 5 stores information regarding a pointing instance and a pointed instance of the pointer attribute in relation to each other. In FIG. 4, the object class (=circuit Pack) as a pointing instance and the pointer attribute (=affected Object List) are stored with respect to the object class (=ds3LineTTPBid) as a pointed instance. Additionally, the object class (=uni) as a pointing instance and the pointer attribute (=underlyingTTP) are stored with respect to the object class (=tcAdapterTTP) as a pointing instance.

Accordingly, the object class (=circuit Pack) is obtained by searching the knowledge database 5. Then, the agent database 4 is searched by using the obtained object class (=circuit Pack). As a result, a group of instances are extracted, and the agent database 4 is further searched based on a condition that the pointer attribute (=affected Object List) has {A.1, B.3}.

In this case, the instance of MO Class:(ds3LineTTPBid) corresponds to the instance b shown in FIG. 3; the instance of MO Class: (circuit Pack) corresponds to the instance a shown in FIG. 3; Naming Attribute D:2, affected Object List={A.1, B.3} corresponds to the pointer attribute p shown in FIG. 3. It should be noted that "D:2" is not shown in FIG. 3.

Accordingly, the affected Object List of the instances extracted as the result of search of the agent database 4 is deleted. Then, the MO interface agent 2 sends an object deletion notification and an attribute value change notification to the MO interface manager. The object deletion notification indicates that (ds3LineTTPBid, FDN={A.1, B.3} is deleted, and the attribute value change notification indicates that (circuit Pack, affected object list) is changed.

That is, the agent database 4 is searched by referring to the knowledge database 5 in accordance with the request of deletion or creation, and the corresponding attribute value is deleted or created in response to the request of deletion or creation, and the notification of the result is sent to the MO interface manager.

Figure 5:
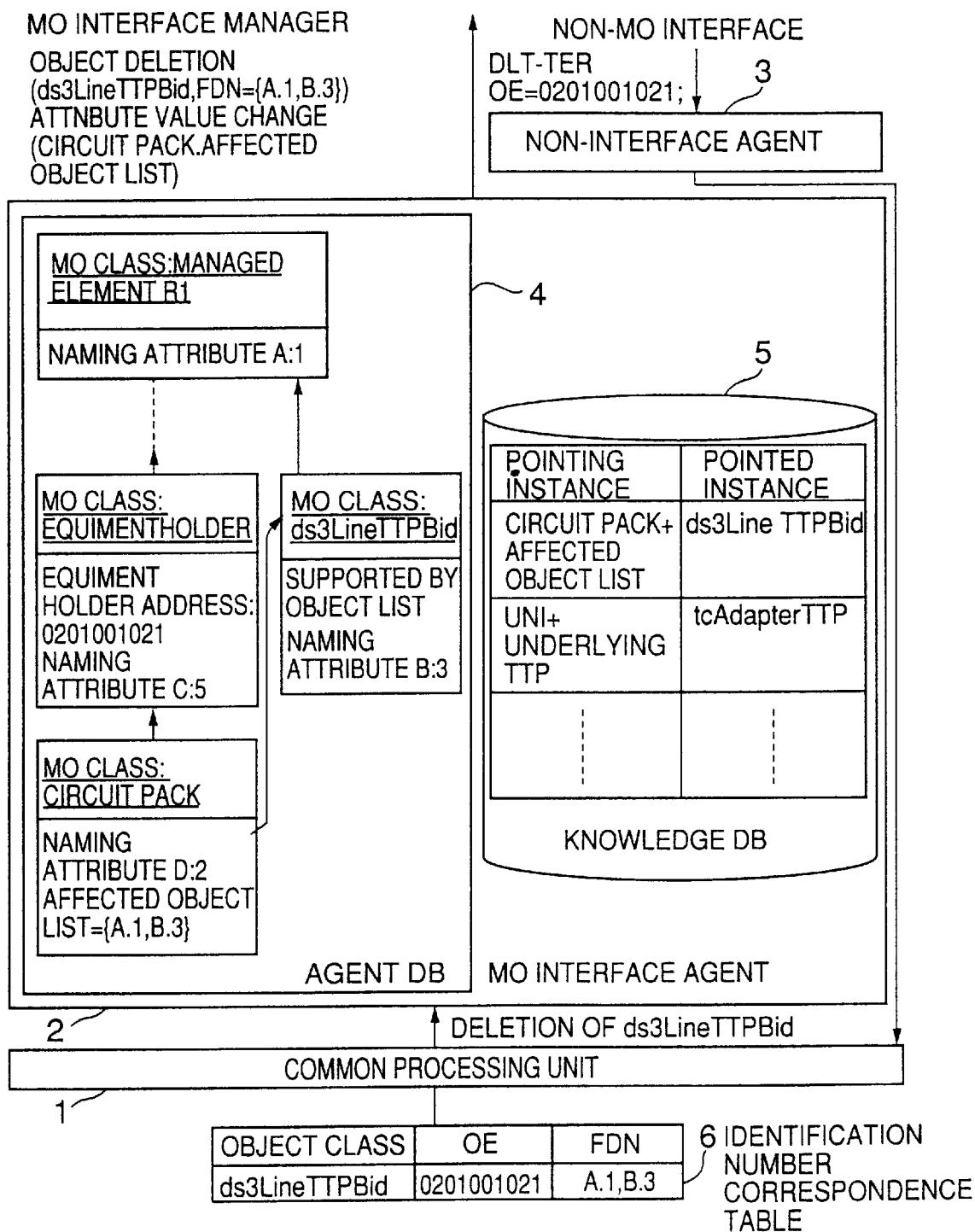
FIG. 5 is an illustration for explaining an operation of the switching apparatus shown in FIG. 3 when a request for deleting resources is issued by a non-MO interface manager.

FIG. 5 is an illustration for explaining an operation of the switching apparatus shown in FIG. 3 when a request for deleting resources is issued by the non-MO interface manager. In FIG. 5, parts that are the same as the parts shown in FIGS. 3 and 4 are given the same reference numerals. In FIG. 5, an identification number correspondence table 6 is shown which is referred to by the common processing unit 1. The identification number correspondence table 6 stores the object class, storing position information OE and the identification number FDN.

When a request for deleting resources is issued by the non-MO interface manager, that is, when a TL1 command such as (DLT-TER: OE=0201001021) is input to the non-MO interface agent 3, the non-MO interface agent 3 transfers the request for deleting resources to the common processing unit 1.

The common processing unit 1 processes the request of deletion so as to determine whether or not the resources to be deleted are resources managed by the MO interface. If the common processing unit 1 determines that the resources to be deleted are managed by the MO interface, the common processing unit 1 searches the identification number table 6 by using the object class (=ds3LineTTPBid) and the storing position OE (=0201001021) which are related by (TER: OE) of the object to be processed. In this case, the identification number FDN={A.1, B.3} in the MO interface is obtained. Accordingly, the common processing unit 1 sends to the MO interface agent 2 a resource deletion notification including the identification number FDN as indicated by (Deletion of ds3lineTTPBid) in FIG. 5.

The MO interface agent 2 searches the agent database 4 according to the object class (=ds3LineTTPBid) and the identification number FDN (={A.1, B.3}) so as to extract MO class ds3LineTTPBid of the instance to be deleted and delete the extracted instance. Additionally, the MO interface agent 2 searches the knowledge database 5 so as to extract the pointer attribute pointing to the extracted instance.

Then, the MO interface agent 2 deletes the value {A.1, B.3} of the pointer attribute (affected object List) of the MO class (circuit Pack) of the agent database 4 in accordance with the extracted (circuit Pack+affected Object List). Thereafter, the MO interface agent 2 sends to the MO interface manager a change notification that is an object deletion notification (ds3LineTTPBid, FDN={A.1, B.3}), attribute Value Change (circuit Pack, affected Object List).

Although the operation for deleting an instance is described above, an operation for referring to, creating or changing can be performed in a similar manner by the MO interface agent 2 by referring to, creating or changing the pointer attribute value of the agent database 4 by referring to the knowledge database 5. Additionally, the present invention is not limited to the combination of the MO interface using CMIP and the non-MO interface using the TL1 command, and is applicable to a system including other interfaces.

The present invention is not limited to the specifically disclosed embodiments, and variations and modifications may be made without departing from the scope of the present invention.

The present application is based on Japanese priority application No.10-244725 filed on Aug. 31, 1998, the entire contents of which are hereby incorporated by reference.

What is claimed is:

1. A system managing method for managing a system having a plurality of interfaces including a managed object interface and a non-managed object interface, the managed object interface handling resources as managed objects, the non-managed object interface handling resources as non-managed objects, the system managing method comprising the steps of:

managing pointer attributes stored in a knowledge database by a managed object interface agent independently of a common processing unit performing operations common to the plurality of interfaces, the pointer attributes being representative of a relationship between instances defined in an agent database which stores resources of an apparatus as instances of a managed object type in said managed object interface;

performing a process requested by said managed object interface against the agent database by referring to the knowledge database by said managed object interface agent; and sending a process request to said managed object interface agent when the process request is sent from one of the interfaces other than said managed object interface and when said common processing unit determines that the process request relates to the managed objects.

2. The system managing method as claimed in claim 1, further comprising the step of:

deleting, adding or updating a value of the pointer attribute in the agent database which manages the resources as instances of the managed object type, by referring to the knowledge database defining a relationship between a pointing instance and a pointed instance defined in each pointer attribute with respect to the process request sent from one of said managed object interface and said common processing unit.

3. A system managing apparatus for managing a system having a plurality of interfaces including a managed object interface and a non-managed object interface, the managed object interface handling resources as managed objects, the non-managed object interface handling resources as non-managed objects, the system managing apparatus comprising:

a common processing unit performing operations common to the plurality of interfaces;

a managed object interface agent connected to said managed object interface, said managed object interface agent managing pointer attributes independently of said common processing unit; and a non-managed object interface agent connected to said non-managed object interface, wherein said managed object interface agent includes a knowledge database and an agent database, said knowledge database storing information regarding a pointing instance and a pointed instance defined in each pointer attribute, said agent database holding the resources as instances of the managed object type so as to delete, add or update a value of each pointer attribute in the agent database by referring to the knowledge database according to a process request.

4. The system managing apparatus as claimed in claim 3, wherein said common processing unit stores identification number correspondence table information from which an identification number used for searching said agent database in response to a process request from said non-managed object interface agent is read.

* * * * *